Figure 1:
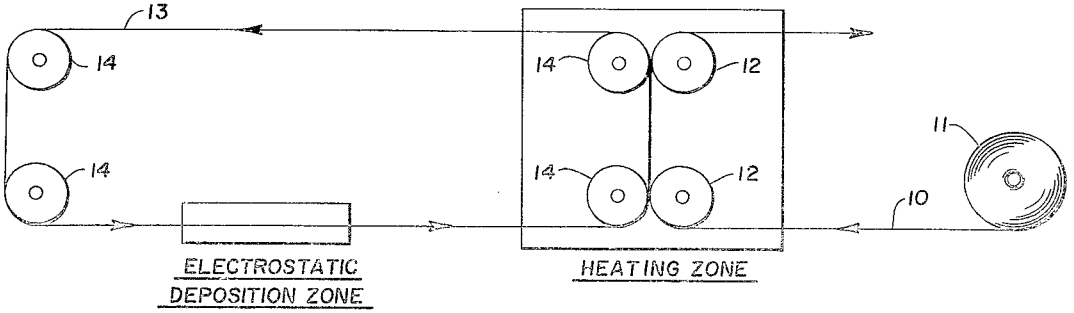

United States Defensive Publication

[19] (H) [11] T957,001

Chitwood

[43] Apr. 5, 1977

[54] DYEING PROCESS

[76] Inventor: James L. Chitwood, Rte. 8, 4412 Beechcliff Dr., Kingsport, Tenn. 37664

[21] Appl. No.: 664,462

[22] Filed: Mar. 8, 1976

Related U.S. Application Data

[63] Continuation of Ser. No. 543,194, Jan. 22, 1975, abandoned.

[51] Int. Cl.[2] ..... D06P 5/00

[52] U.S. Cl. ..... 8/2; 8/2.5 A; 96/1 R

[57] ABSTRACT

Disclosed is a process for dyeing comprising continually electrostatically depositing a powdered dye on a grounded electrically conductive reusable substrate, continuously positioning the grounded electrically conductive reusable substrate adjacent a heatable fabric and continuously heating the heatable fabric and powdered dye at a temperature and time sufficient to cause the powdered dye to diffuse into the fabric.

3 Claims, 1 Sheet Drawing,

6 Pages Specification

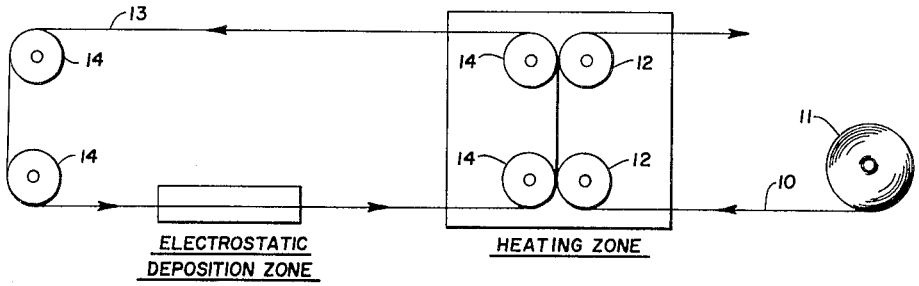

The file of this unexamined application may be inspected and copies thereof may be purchased (849 O.G. 1221, Apr. 9, 1968).